United States Patent Office 3,644,637
Patented Feb. 22, 1972

3,644,637
FUNGICIDAL MUCONONITRILES
Dennis Ernest Burton, Saffron Walden, Essex, England, assignor to Fisons Limited, Suffolk, England
No Drawing. Continuation-in-part of application Ser. No. 669,305, Jan. 22, 1968. This application July 17, 1969, Ser. No. 842,707
Claims priority, application Great Britain, July 18, 1968, 34,188/68
Int. Cl. C07c *121/30*
U.S. Cl. 424—304         11 Claims

ABSTRACT OF THE DISCLOSURE

Fungicidal and pesticidal compositions contain as an active ingredient a mucononitrile of the formula:

$$NC-CR^1=CR^2-CR^3=CR^4-CN$$

wherein $R^1$, $R^2$, $R^3$ and $R^4$ may be the same or different and are selected from the group consisting of hydrogen, halogen, alkyl, substituted alkyl or alkoxy. In a particular aspect of the invention compositions are adapted to release the mucononitrile in vapour form.

---

The application is a continuation-in-part application of application Ser. No. 699,305, filed Jan. 22, 1968.

The present invention relates to improved pesticidal compositions and to new compounds possessing pesticidal activity.

It has been found that the mucononitriles hereinafter referred to are active pesticides and are useful as fungicides, bactericides, insecticides and herbicides. In this specification the term pesticide and pesticidal is to be understood as describing compounds or compositions which may be used to control any undesired or noxious organisms, including but not limited to plants, animals, insects and micro-organisms.

Accordingly, the present invention is for a pesticidal composition which contains as an active ingredient a mucononitrile of the formula:

$$NC-CR^1=CR^21CR^3=CR^4-CN$$

where $R^1$, $R^2$, $R^3$ and $R^4$ may be the same or different and represent hydrogen, halogen (for example chlorine, bromine, iodine or fluorine), alkyl (for example of 1–5 carbon atoms such as methyl or ethyl), substituted alkyl (for example of 1–5 carbon atoms substituted by halogen or alkoxy such as chloromethyl or ethoxyethyl) or alkoxy (for example of 1–5 carbon atoms such as methoxy or ethoxy). The pesticidal composition suitably also contains at least one material selected from the group comprising inert carriers, solid diluents, wetting agents and high boiling solvents or oils.

The present invention is also for the treatment of plants, the soil, land or aquatic areas or materials which comprises applying thereon or thereto a mucononitrile as identified above.

The present invention is also for the new mucononitriles of the formula:

$$NC-CR^1=CR^2-CR^3=CR^4-CN$$

where $R^1$, $R^2$, $R^3$ and $R^4$ are as defined above, provided that not more than one of the groups $R^1$, $R^2$, $R^3$ and $R^4$ is hydrogen.

The mucononitriles are suitably prepared by the oxidation of the corresponding ortho-phenylene diamine; this oxidation is suitably effected with lead tetra-acetate, yielding the cis, cis isomers.

The mucononitriles are of particular value as fungicides; they may also be used as bactericides, insecticides and herbicides. The mucononitriles find particular application as soil fungicides and as seed dressings.

The mucononitriles are generally insoluble, or of low solubility, in water, and may be formulated in any of the ways commonly used for compounds of low solubility.

If desired the mucononitrile may be dissolved or dispersed in a water immiscible solvent, such as for example a high boiling hydrocarbon or oil suitably containing dissolved emulsifying agents so as to act as a self-emulsifiable oil on addition to the water.

The mucononitrile may also be admixed wtih a wetting agent with or without an inert diluent to form a wettable powder which is soluble or dispersible in water, or may be mixed with an inert diluent to form a solid or powdery product, with or without a wetting agent.

Inert diluents with which the mucononitrile may be incorporated include solid inert media comprising powdered or divided solid materials, for example, clays, sands, talc, mica fertilizers and the like, such products either comprising dust or larger particle size materials.

The wetting agents used may comprise anionic compounds such as for example soaps, fatty sulphate esters such as dodecyl sodium sulphate, octadecyl sodium sulphate and cetyl sodium sulphate, fatty aromatic sulphonates such as alkyl-benzene sulphonates or butyl naphthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example, condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may be also comprise cationic agents such as for example cetyl trimethylammonium bromide and the like.

The pesticide composition according to the present invention may contain in addition to the mucononitriles other active materials, such as fungicides, insecticides, bactericides and herbicides. It has been found that particular advantages are obtained with mixtures with other fungicides.

It has been found that the volatile nature of these mucononitriles is such that these compounds are particularly adapted for use as fungicides in the vapour form.

Accordingly the present invention is for a process for the treatment of seeds, the soil, plants, areas, materials or articles which comprises bringing into contact therewith the vapour of a mucononitrile of the formula:

$$NC-CR^1=CR^2-CR^3=CR^4-CN$$

where $R^1$, $R^2$, $R^3$ and $R^4$ have the significance indicated above.

The present invention is also for a composition containing a mucononitrile as identified above adapted to release the mucononitrile in vapour form.

The methods and compositions for the release of the mucononitrile in vapour form may be conventional and include granules of inert material with a surface coating of the mucononitrile, solutions or suspensions in a form suitable for painting on surfaces, aerosol formulations, distribution on heated plates (such as the "AEROVAP" apparatus), smoke generators and the like.

A particularly convenient form of composition is as a granule of a solid carrier, such as limestone, chalk and the like which contains a surface coating of the mucononitrile. The surface coating of the mucononitrile may be obtained by coating a granule with particles of the mucononitrile together with a sticking agent so that particles of the mucononitrile adhere to the surface of the granules or may be obtained by impregnating the surface of the granule with a solution or suspension of the mucononitrile, and allowing the granule to dry. Fully impregnated granules may also be used, and release the vapour over a longer period. Other compositions which may be used include impregnated plastic sheets and capsules with porous coatings through which the mucononitrile gradually diffuses.

For crops such as potatoes, where an enclosed area is formed between the soil and the leaves of plants in adjoining rows, the distribution of granules containing the mucononitrile between the rows, will provide a vapour source for the treatment of the plants.

The mucononitriles are particularly useful in areas protected by glass such as greenhouses, cloches and the like; the term greenhouses is used herein to cover such arrangements.

For use in greenhouses and the like, the vapour of the mucononitrile may be obtained from granules distributed in the greenhouse, or by other vapour distributing means, such as heated plates and the like containing the mucononitrile.

Materials which may be treated in accordance with the invention include any material susceptible to attack by detrimental organisms and include fabrics, textiles, paper and wood. The vapour treatment with mucononitriles is particularly suited for use in textile stores and the like.

Apparatus which may be treated in accordance with the invention include electrical and other apparatus capable of being treated with vapours, which are susceptible to growth of fungus.

Examples of mucononitriles which may be mentioned include 2,3,4,5-tetrachloromucononitrile, 2,3,4-trichloromucononitrile and 2.3.5-trichoromucononitrile.

For use in seed dressings the mucononitriles are preferably mixed with an inert diluent, e.g. a clay, since this facilitates the admixture with the seed. The mucononitriles are suitably applied to the seed at a rate of 0.05 to 1% and preferably about 0.2% by weight. The dilution of the mucononitrile in the composition used for seed dressing is not critical, and is suitably about 10–50%, and preferably about 25%, by weight. Seeds which are usefully treated in this way include wheat, oats, barley, maize, rice, cotton, peas and beans.

In seed dressings it may be advantageous to include other fungicides such as zineb, maneb, thiuram and captan.

For use as a soil fungicide, the mucononitrile is suitably mixed with the soil in the form of a solution or dispersion at a rate of 10–500, and preferably about 150, parts per million. These rates are calculated in respect of the top 6 inches (15.24 cm.) of soil. At the higher rates of application the mucononitriles act as general soil sterilants.

As used in the specification and claims the term pesticidal composition includes compositions for the treatment of pests and noxious organisms of all kinds including but not restricted to fungal, insect, nematode, acari, bacterial and other pests.

The following examples are given to illustrate the present invention. The parts and percentages are by weight unless otherwise indicated.

EXAMPLE 1

A suspension of 3,4,5,6-tetrachloro-o-phenylenediamine (49.2 parts) in anhydrous benzene (225 parts) was added slowly to freshly prepared lead tetraacetate (180 parts) stirred in anhydrous benzene (1300 parts) at 60° C. Heating was continued for a further two hours and the mixture filtered. The filtrate was added to stirred 20% sodium bicarbonate solution (500 parts) and refiltered. The organic layer was separated and washed with water and then dried. Removal of the solvent gave a solid which was digested with hot petroleum spirit (boiling point 40–60° C.) The extract was treated with charcoal and concentrated until crystallisation occurred. The product, 2,3 4,5-tetrachloromucononitrile (27.2 parts, 56% yield) was obtained as pale yellow prisms, melting point 96–98° C.

*Analysis.*—Found (percent): C, 30.00; Cl, 58.55; N, 11.25. $C_6Cl_4N_2$ requires (percent): C, 29.79; Cl, 58.63; N, 11.58.

EXAMPLES 2–16

By processes analogous to that of Example 1, the following substituted mucononitriles were prepared by lead tetraacetate oxidation of the corresponding ortho-phenylenediamines.

(2) 2,3-dichloromucononitrile, colourless needles, melting point 41–42° C. (13% yield).

*Analysis.*—Found (percent): C, 41.80; H, 1.20; Cl, 41.15; N, 16.15. $C_6H_2Cl_2N_2$ requires (percent): C, 41.65; H, 1.16; Cl, 40.99; N, 16.20.

(3) 2,3,4-trichloromucononitrile, colourless needles, melting point 42–44° C. (49% yield).

*Analysis.*—Found (percent): C, 34.75; H, 0.50; Cl, 51.25. $C_6HCl_3N_2$ requires (percent): C, 34.95; H, 0.70; Cl, 51.05.

(4) 2,3,5-trichloromucononitrile, yellow crystals, melting point 77–78° C. (75% yield).

*Analysis.*—Found (percent): C, 35.15; H, 1.00; Cl, 50.25; N, 13.65. $C_6HCl_3N_2$ requires (percent) C, 34.95; H, 0.70; Cl, 51.05; N, 13.30.

(5) 2,4-dichloromucononitrile, colourless needles, melting point 60–61.5° C. (41% yield).

*Analysis.*—Found (percent): C, 41.50; H, 1.00; Cl, 41.00; N, 16.15. $C_6H_2Cl_2N_2$ requires (percent): C, 41.65; H, 1.16; Cl, 40.99; N, 16.20.

(6) 2,5-dichloromucononitrile, off-white needles, melting point 161–163° C. (40% yield).

*Analysis.*—Found (percent): C, 41.80; H, 1.40; Cl, 41.10; N, 16.25. $C_6H_2Cl_2N_2$ requires (percent): C, 41.65; H, 1.16; Cl, 40.99; N, 16.20.

(7) 3,4-dichloromucononitrile, pale yellow needles, melting point 51–53 C. (21% yield).

*Analysis.*—Found (percent): C, 41.55; H, 1.25; Cl, 40.95; N, 16.25. $C_6H_2Cl_2N_2$ requires (percent): C, 41.65; H, 1.16; Cl, 40.99; N, 16.20.

(8) 2,4-dibromomucononitrile, pale cream needles, melting point 73–74° C. (39% yield).

*Analysis.*—Found (percent): C, 27.80; H, 0.80; Br, 60.85; N, 10.75 $C_6H_2Br_2N_2$ requires (percent): C, 27.51; H, 0.77; Br, 61.02; N, 10.70.

(9) 3-tert-butylmucononitrile, colourless needles, melting point 77–78.5° C. (38% yield).

*Analysis.*—Found (percent): C, 75.00; H, 7.75; N, 17.65. $C_{10}H_{12}N_2$ requires (percent): C, 74.96; H, 7.55; N, 17.49.

(10) 2,3,5-trichloro-4-methylmucononitrile, off-white needles, melting point 111–113° C. (63% yield).

*Analysis.*—Found (percent): C, 38.15; H, 1.10; N, 12.60. $C_7H_3Cl_3N_2$ requires (percent): C, 37.95; H, 1.37; N, 12.65.

(11) 2,5-dichloro-3-methylmucononitrile, yellow crystalline solid, melting point 56–57° C. (48% yield).

*Analysis.*—Found (percent): C, 44.70; H, 2.30; N, 14.95. $C_7H_4Cl_2N_2$ requires (percent): C, 44.95; H, 2.16; N, 14.98.

(12) 2,4-dichloro-3-methylmucononitrile, pale brown needles, melting point 44–45° C. (32% yield).

*Analysis.*—Found (percent): C, 45.00; H, 1.80; N, 15.10. $C_7H_4Cl_2N_2$ requires (percent): C, 44.95; H, 2.16; N, 14.98.

(13) 2,3,4-tribromomucononitrile, pale yellow needles, melting point 68–69° C. (59% yield).

*Analysis.*—Found (percent): C, 20.90; H, 0.30; N, 7.95. $C_6HBr_3N_2$ requires (percent): C, 21.14; H, 0.30; N, 8.22.

(14) 2-bromo-4-chloromucononitrile, yellow needles, melting point 70–72° C. (28% yield).

*Analysis.*—Found (percent): C, 33.20; H, 0.80; N, 12.85. $C_6H_2BrClN$ requires (percent): C, 33.13; H, 0.93; N, 12.88.

(15) 2-bromo-3,4,5-trichloromucononitrile, light brown crystals, melting point 97–99° C. (70% yield).

*Analysis.*—Found (percent): C, 25.05; Br, 27.70; Cl, 37.10. $C_6BrCl_3N_2$ requires (percent): C, 25.16; Br, 27.90; Cl, 37.15.

(16) 3-bromo-2,4,5-trichloromucononitrile, melting point 92–94° C. (42% yield).

*Analysis.*—Found (percent): C, 25.45; N, 9.60. $C_6BrCl_3N_2$ requires (percent): C, 25.16; N, 9.79.

EXAMPLES 17–24

The compounds 2,3-dichloromucononitrile, 2,4-dichloromucononitrile, 2,5-dichloromucononitrile, 3,4-dichloromucononitrile, 2,3,4-trichloromucononitrile, 2,3,5-trichloromucononitrile, 2,3,4,5-tetrachloromucononitrile and 2,4-dibromomucononitrile were each incorporated into the nutrient medium known as potato dextrose agar in the molten state at a concentration of 10 parts per million. The liquids were poured into petri dishes and, when cool, the culture plates were inoculated with mycelial plugs of the following eight fungal species.

*Phytophthora palmivora*
*Rhizoctonia solani*
*Fusarium oxysporum* f. cubense
*Verticillium albo-atrum*
*Lenzites trabae*
*Aspergillus niger*
*Cladosporium herbarum*
*Penicillium digitatum*

The plates were cultered at 20° C. for 7 days and then the amount of fungal growth was measured in comparison with control experiments carried out without the chemical. It was found that in all cases the compounds had inhibited the growth of the fungi by at least 95%.

EXAMPLES 25–30

A 1% solution of each of the compounds, 2,3-dichloromucononitrile, 2,4-dichloromucononitrile, 3,4-dichloromucononitrile, 2,3,4-trichloromucononitrile, 2,3,5-trichloromucononitrile and 2,4-dibromomucononitrile in polyethylene glycol (the commercial product Carbowax 400) was diluted with 2% dextrose nutrient broth, to give concentrations of 1000, 200, 40 and 8 parts per million (p.p.m.) of the compounds. Samples at these concentrations were then inoculated with suspensions of the bacteria *Xanthomonas malvacearum* and *Corynebacter michiganese* and the cultures then incubated for eight days at 25° C. At the end of this period the bacteriostatic activity of each compound was assessed by visual inspection of the bacterial growth. To measure the bactericidal activity, 24 hours after inoculation a loopful of broth was transferred from each sample into 5 millilitres, of untreated medium and incubated for seven days at 25° C. after which the bacterial development was assessed.

It was found that 2,3-dichloromucononitrile, 2,4-dichloromucononitrile, 3,4-dichloromucononitrile and 2,3,5-trichloromucononitrile were bacteriostatic and bactericidal to both organisms at concentrations down to 8 p.p.m. and that 2,3,4-trichloromucononitrile and 2,4-dibromomucononitrile were bacteriostatic to both organisms at concentrations down to 8 p.p.m. and bactericidal to both organisms at concentrations down to 40 p.p.m.

EXAMPLES 31–37

Filter papers were treated with acetone solutions at mucononitrile derivatives listed below at such a rate as to leave deposits of the mucononitrile derivatives of 30, 10 and 3 milligrams per square foot (mg./ft.$^2$) (mg/0.09 m.$^2$). When the acetone had evaporated off, the papers were placed in petri dishes into which light anaesthetised female adult houseflies (*Musca domestica*) were introduced. After 24 hours the percentage mortality at each concentration was noted and the $LD_{50}$ calculated.

Results are tabulated below:

| Example No. | Compound | $LD_{50}$ mg./ft.$^2$ (mg./0.09 m.$^2$) |
|---|---|---|
| 31 | 2,3-dichloromucononitrile | 3.0 |
| 32 | 2,4-dichloromucononitrile | 3.0 |
| 33 | 3,4-dichloromucononitrile | 5.5 |
| 34 | 2,3,4-trichloromucononitrile | 3.0 |
| 35 | 2,3,5-trichloromucononitrile | 5.5 |
| 36 | 2,3,4,5-tetrachloromucononitrile | 5.5 |
| 37 | 2,4-dibromomucononitrile | 17 |

EXAMPLES 38–44

Glass petri dishes were sprayed with acetone solutions of mucononitrile derivatives listed below at such a rate as to leave deposits of the mucononitrile derivatives of 10, 3, 1 and 0.1 milligrams per square foot (per 0.09 m.$^2$). After 24 hours, lightly anaesthetised female adult mosquitos (*Aedes aegypti*) were introduced into the petri dishes. After a further 24 hours the percentage mortality at each concentration was noted and the $LD_{50}$ calculated.

Results are tabulated below:

| Example No. | Compound | $LD_{40}$ mg./ft.$^2$ (mg./0.09 m.$^2$) |
|---|---|---|
| 38 | 3-tert-butylmucononitrile | 2.3 |
| 39 | 2,3-dichloromucononitrile | 0.15 |
| 40 | 2,4-dichloromucononitrile | 0.5 |
| 41 | 3,4-dichloromucononitrile | 0.39 |
| 42 | 2,3,4-trichloromucononitrile | 1.75 |
| 43 | 2,3,5-trichloromucononitrile | 0.5 |
| 44 | 2,4-dibromomucononitrile | 0.33 |

EXAMPLE 45

A soil composition made up of 2 parts sand, 1 part loam and John Innes base fertilizer was artificially infested with root-knot eelworms, Meloidogyn sp., by adding and mixing in thoroughly finely chopped infested tomato roots. The soil was then treated with a solution of 2,3,5-trichloromucononitrile at rates equivalent to 62.5 and 31.25 parts per million (wt. of active ingredient per volume of soil) and thoroughly mixed in a plastic bag. After five days incubation at 28° C. in a sealed glass jar the soil was transferred to 3″ (7.6 cm.) diameter pots—three replications of each concentration together with three control pots of untreated infested soil and three pots treated with the standard nematicide DD-(dichloropropylene and dichloropropane mixture) at 125 p.p.m.

Young tomato seedlings were then planted in the pots and the plants grown for a further 14 days at 28° C. After this time the plants were removed from the pots and then washed and assessed for nematode attack. The assessment was based on a 0–4 scale where 0=no attack and 4=plant roots very severely damaged. The results are shown in the following table:

| Compound | Rate, p.p.m. | Root-knot assessment |
|---|---|---|
| 2,3,5-trichloromucononitrile | 62.5 | 0.3 |
|  | 31.25 | 2.3 |
| DD | 125 | 0.5 |
| Control | | 4.0 |

EXAMPLE 46

Peas (*Pisum sativum*), mustard (*Sinapis alba*), linseed (*Linum usitatissimum*), sugarbeet (*Beta vulgaris*), oat (*Avena sativa*) and ryegrass (Lolium sp.) were grown in aluminum pans (7½″ x 3¾″ x 2″) (19 x 9.5 x 5 cm.) containing John Innes potting compost—two species per pan. When the plants were 2–3″ (5–7.5 cm.) high and the first true leaves were fully expanded they were sprayed with an acetone/water suspension of 2,3,5-trichloromucononitrile at a rate equivalent to 10, 5 and 2½ lbs. per acre (11.2, 5.6 and 2.8 kg. per hectare) in 80 gallons (360 litres).

After 7 days growth under controlled environment conditions—22° C. with 14 hours illumination at 1,200 ft. candles (129120 lux)—the activity of the compound against the plants was assessed on a 0–100 score where 0= no damage and 100=complete kill.

| Compound | Rate Lbs./acre | Rate Kg./ha. | Peas | Mustard | Linseed | Sugar beet | Oats | Rye grass |
|---|---|---|---|---|---|---|---|---|
| 2,3,5-trichloromucononitrile | 10 | 11.2 | 15 | 98 | 100 | 98 | 20 | 80 |
| | 5 | 5.6 | 10 | 80 | 90 | 50 | 5 | 12 |
| | 2.5 | 2.8 | 3 | 30 | 65 | 45 | 3 | 10 |

EXAMPLE 47

A formulation suitable for seed dressing was prepared as follows:

| | Percent |
|---|---|
| 2,3,5-trichloromucononitrile | 25 |
| Risella oil | 1 |
| Attaclay | 74 |

This seed dressing was mixed with barley at a rate of 2% by weight (i.e. 0.5% by weight active ingredient), and was found to give complete protection from fungal attack.

In the general use of the mucononitriles as fungicides, these may be applied to plants in any of the conventional ways, viz. by dusting, spraying with aqueous dispersions, etc. at rates of the order of 0.5–2 lbs. per acre. The extent of dilution of the mucononitrile in the composition applied to the plants does not seem in any way critical and may vary for example from 5–50% by weight and is suitably about 25% by weight.

EXAMPLE 48

Granules were prepared by mixing together limestone grit granules and a mixture of 2,3,5-trichloromucononitrile and stickers.

The weight proportions were as follows:

| | Percent |
|---|---|
| Limestone grit | 96.05 |
| 2,3,5-trichloromucononitrile | 2 |
| Calflo E | 0.7 |
| Carbowax 400 | 1.25 |

The resulting granules had a 2% coating of 2,3,5-trichloromucononitrile.

EXAMPLE 49

In these tests the plants were placed in chambers formed by thin polyethylene sheets stretched over a metal framework. The plants used in the test were potato, broad bean, French bean and vine, grown in pots.

Aqueous suspensions of the pathogens listed below were sprayed on the plant species indicated—

Pathogen: Plant species
Phytophthora infestans _____ Potato.
Botrytis fabae _____ Broad Bean.
Uromyces phaseoli _____ French Bean.
Plasmopara viticola _____ Vine.

After being sprayed with the pathogen, the plants were placed in the chambers referred to above, in which trays of warm water were placed to ensure the air within the chambers was saturated with water.

Granules prepared as described in Example 48 were placed in small crystallising dishes beside each plant; control plants were grown in similar conditions but in chambers not containing the granules.

The plants were grown under normal conditions, and after a period of days the effectiveness of protection was estimated by comparison with the development of fungal grown on the control plants.

The following results were obtained:

| Species and host plant | Period of days | Percentage control of disease |
|---|---|---|
| Phytophthora infestans on potato | 4 | 100 |
| Botrytis fabae on broad bean | 4 | 96 |
| Uromyces phaseoli on French bean | 4 | 99 |
| Plasmopara viticola on vine | 10 | 100 |

EXAMPLE 50

An emulsifiable oil formulation was prepared by mixing the following:

| | Percent |
|---|---|
| 2,3,5-trichloromucononitrile | 25 |
| Texofor D20 (condensation product of castor oil and ethylene oxide) | 6 |
| Arylan CA (Calcium dodecylbenzene sulphonate) | 4 |
| Aromatic hydrocarbon solvent (B.P. range 210–280° C.) | 65 |

EXAMPLE 51

The formulation of Example 50 was diluted with water and applied to the soil in which strawberry plants were growing in rows under cloches. Excellent control of grey mould (Betrytis cinerea) was obtained compared with untreated control plants in adjoining rows in which the fruit was severely affected by the fungus.

I claim:
1. A pesticidal composition which contains as an active ingredient a fungicidally effective amount of a mucononitrile of the formula:

$$NC-CR^1=CR^2-CR^3=CR^4-CN$$

wherein $R^1$, $R^2$, $R^3$, and $R^4$ are selected from the group consisting of hydrogen, halogen, alkyl of 1 to 5 carbon atoms, haloalkyl of 1 to 5 carbon atoms, lower alkoxyalkyl wherein the alkyl is of 1 to 5 carbon atoms and alkoxy of 1 to 5 carbon atoms and at least one material selected from the group consisting of inert carriers, solid diluents, wetting agents, high boiling solvents and oils.

2. A composition as claimed in claim 1 which also contains one or more other fungicides, insecticides and bactericides.

3. A composition as claimed in claim 1 which is seed dressing.

4. A composition as claimed in claim 1, which is a soil fungicide.

5. A fungicidal and pesticidal composition as claimed in claim 1 which comprises a granule of a solid carrier containing a surface coating of the mucononitrile.

6. A fungicidal and pesticidal composition as claimed in claim 1 which comprises a solution or suspension suitable for painting on surfaces.

7. A fungicidal and pesticidal composition as claimed in claim 1 which comprises an aerosol package.

8. A process for the treatment of seeds, the soil, plants, land and aquatic areas susceptible to the growth of fungus which comprises applying thereon or thereto an effective amount of a composition as claimed in claim 1.

9. A process according to claim 8 wherein the mucononitrile contacting said seeds, soil, plants, land and aquatic areas is in vapor form.

10. A process as claimed in claim 8 applied to the treatment of plants in a greenhouse which comprises liberating the vapor of the mucononitrile in the greenhouse.

11. A process as claimed in claim 8 applied to the treatment of crops such as potatoes, wherein an enclosed area is formed between the soil and the leaves of the plants in adjoining rows, which comprises distributing granules containing the mucononitrile between the rows.

References Cited

UNITED STATES PATENTS

| | | | |
|---|---|---|---|
| 2,356,075 | 8/1944 | Migrdichian | 260—465.7 X |
| 2,416,004 | 2/1947 | Hall | 424—304 |
| 2,433,742 | 12/1947 | Davis | 424—304 |
| 3,417,130 | 12/1968 | Pruett et al. | 260—465.3 |

OTHER REFERENCES

Nakagawa et al.: Chem. Abst. 63:16257b (1965).

SHEP K. ROSE, Primary Examiner

U.S. Cl. X.R.

47—58; 71—105